(12) United States Patent
Russell

(10) Patent No.: US 8,210,559 B2
(45) Date of Patent: Jul. 3, 2012

(54) TRAILER HITCH DEVICE

(76) Inventor: Gregory Alan Russell, Brookfield, IL (US)

( * ) Notice: Subject to any disclaimer, the term of this patent is extended or adjusted under 35 U.S.C. 154(b) by 0 days.

(21) Appl. No.: 13/006,194

(22) Filed: Jan. 13, 2011

(65) Prior Publication Data
US 2011/0175324 A1   Jul. 21, 2011

Related U.S. Application Data

(60) Provisional application No. 61/295,580, filed on Jan. 15, 2010.

(51) Int. Cl.
*B60D 1/14* (2006.01)
(52) U.S. Cl. ......................................................... 280/507
(58) Field of Classification Search .................. 280/507
See application file for complete search history.

(56) References Cited

U.S. PATENT DOCUMENTS

| 4,451,066 | A  | * | 5/1984  | Collins ............................. 280/508 |
| 4,773,508 | A  | * | 9/1988  | Mine et al. ...................... 187/296 |
| 6,193,260 | B1 | * | 2/2001  | Homan et al. ................... 280/515 |
| 6,382,657 | B1 | * | 5/2002  | Lynn et al. ...................... 280/507 |
| 6,802,523 | B1 | * | 10/2004 | Profitt ............................. 280/507 |
| 7,530,592 | B2 | * | 5/2009  | Heitlinger et al. ............. 280/515 |

* cited by examiner

*Primary Examiner* — Tony Winner
(74) *Attorney, Agent, or Firm* — Michael Ries

(57) ABSTRACT

A trailer hitch device that includes a yoke assembly with a yoke section and a latch section, a latch assembly integral with the latch section with a latch pivot bolt, two latch plates pivotally connected by the latch pivot bolt and a horizontal coupling shaft having two external ends, where the external ends are dimensioned to fit into a vertical opening on the sides of latch section secured by the latch plates. There is also a trailer yoke that the horizontal coupling shaft passes through that can be securely and pivotally connected to the latch assembly by placing the horizontal coupling shaft in the vertical openings of the latch section, rotating the latch plates down over the horizontal coupling shaft and securing the latch plates in position and a longitudinal pivot rivet adjustably disposed on the vehicle side of trailer hitch device.

20 Claims, 3 Drawing Sheets

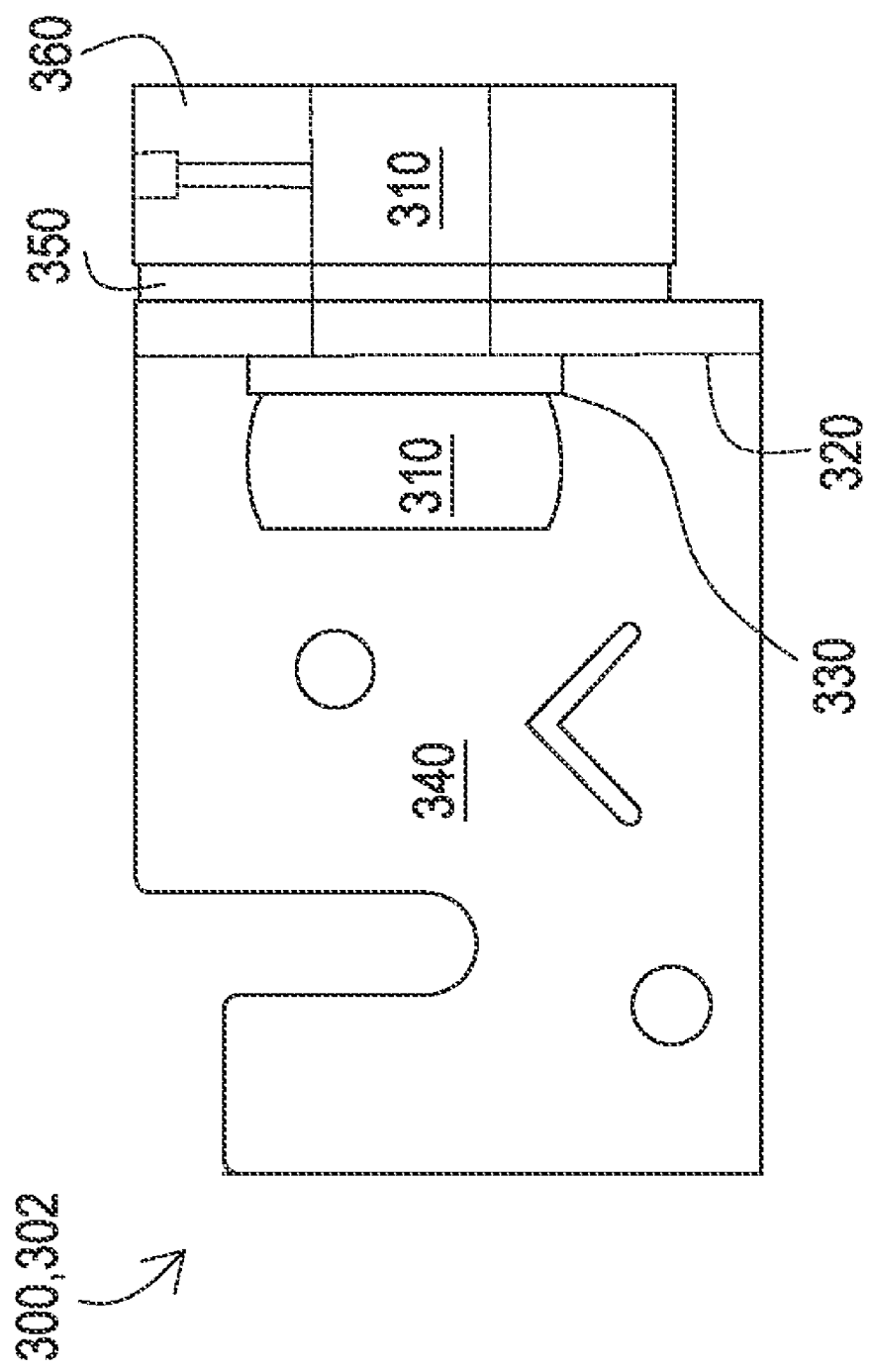

TRAILER HITCH DEVICE

This application claims priority to U.S. Provisional Application 61/295,580 filed on Jan. 15, 2010, the entire disclosure of which is incorporated by reference.

TECHNICAL FIELD & BACKGROUND

Some trailer hitch devices are used to provide a rotatable mechanical coupling between a towing vehicle and a trailer. This type of rotatable mechanical coupling can have a lock and roll design. Unfortunately, when the trailer and towing vehicle have been 90 degrees to each other, the lock and roll designed trailer hitch with a component attached to the vehicle rotates downward and when the vehicle moves forward, the vehicle and the trailer attempt to realign. With the absence of a vertical force to maintain the downward rotation, the forward direction of the vehicle twists and can possibly damage the assembly of the lock and roll designed trailer hitch that contains a coupling shaft. Often, the assembly that contains the coupling shaft is a T-shaped assembly.

The present invention generally relates to a trailer hitch device. More specifically, the invention is a trailer hitch device with a lock and roll designed rotatable mechanical coupling.

It is an object of the invention to provide a lock and roll designed trailer hitch device with improved safety, ease of use and durability that can reduce the possibility of damage from jack-knifing.

What is really needed is an improved lock and roll designed trailer hitch device with improved safety, ease of use and durability that can also reduce the possibility of damage from jack-knifing by changing the rotation of the lock and roll designed trailer hitch about the longitudinal axis from the trailer side to the vehicle side of the lock and roll designed trailer hitch device.

BRIEF DESCRIPTION OF THE DRAWINGS

The present invention will be described by way of exemplary embodiments, but not limitations, illustrated in the accompanying drawing in which like references denote similar elements, and in which:

FIG. 3 illustrates a side perspective view of a longitudinal pivot rivet of a trailer hitch device, in accordance with one embodiment of the present invention.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments.

However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
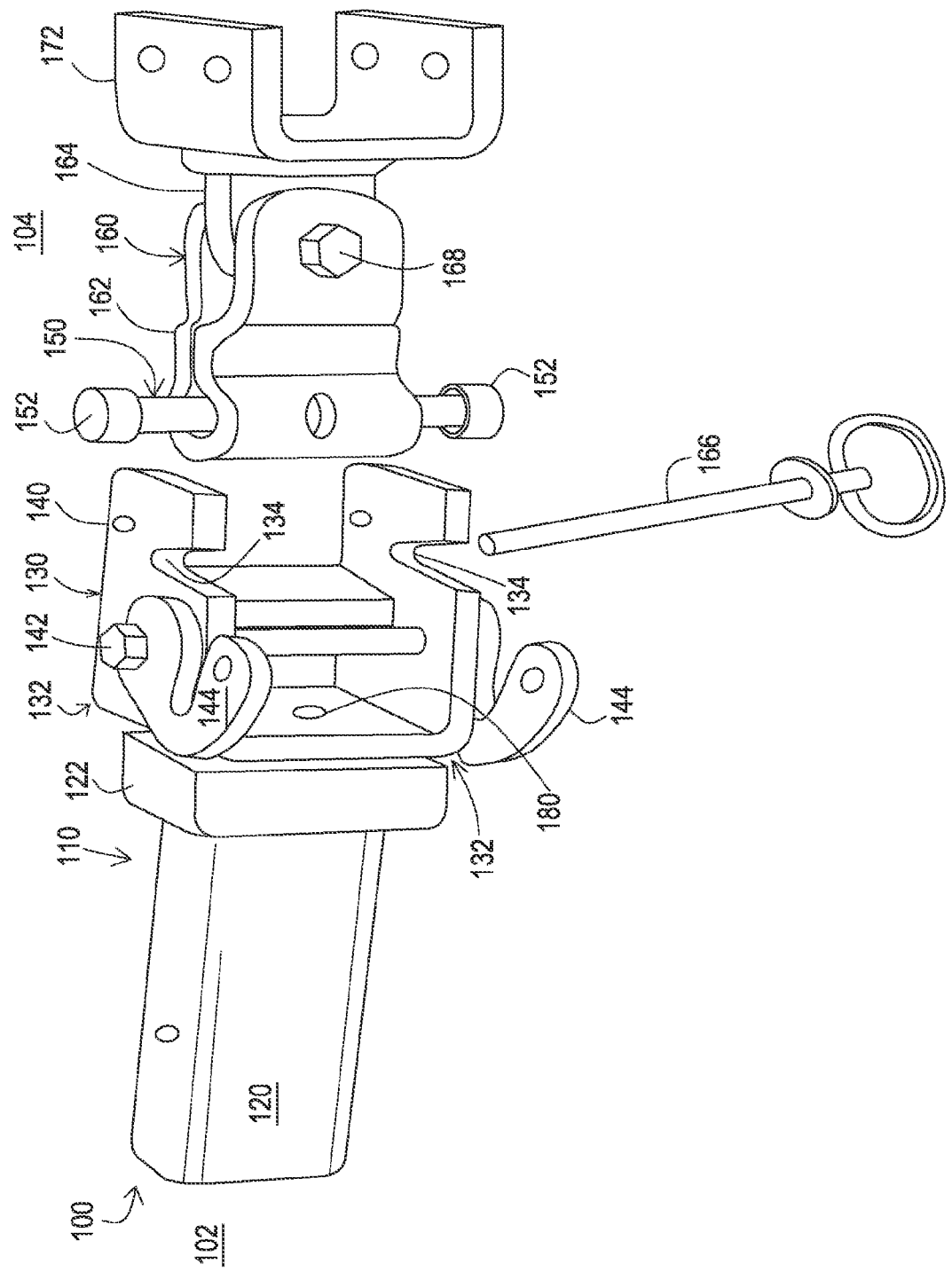
FIG. 1 illustrates a partially exploded side perspective view of a trailer hitch device, in accordance with one embodiment of the present invention.

FIG. 1 illustrates a partially exploded side perspective view of a trailer hitch device 100, in accordance with one embodiment of the present invention.

The trailer hitch device 100 includes a yoke assembly 110 with a yoke section 120 with a washer 122 and a latch section 130 with two sides 132 that includes a latch assembly 140 with a latch pivot bolt 142 and two latch plates 144 pivotally connected on the two sides 132 of the latch section 130 by the latch pivot bolt 142. The trailer hitch device 100 is a lock and roll designed trailer hitch device. There is a horizontal coupling shaft 150 having two external ends 152, where the two external ends 152 are dimensioned to fit into a vertical opening 134 on each side 132 of the latch section 130 to be secured by the two latch plates 144. There is a trailer yoke 160 with a distal end 162 and a proximal end 164, where the horizontal coupling shaft 150 is disposed on and passes through the distal end 162. The horizontal coupling shaft 150 can be securely and pivotally connected to the latch assembly 140 by placing the horizontal coupling shaft 150 in the vertical opening 134 of the latch section 130, rotating the two latch plates 144 down over the horizontal coupling shaft 150 and securing the two latch plates 144 in position with a hitch pin 166 or other type of securing device. The trailer yoke 160 is held together by a vertical pivot bolt 168. The trailer hitch device 100 includes a longitudinal pivot rivet 180 for longitudinally and pivotally connecting the yoke section 120 to the latch section 130, which is on the vehicle side 102 as opposed to the trailer side 104. The longitudinal pivot rivet 180 is used to hold together the yoke assembly 110 instead of holding together the trailer yoke 170 to a trailer bracket 172 or other trailer connection. The longitudinal pivot rivet 180, is an alloy steel rivet used in place of a nut and bolt (not shown) for the longitudinal connection and pivot point that is used with some lock and roll designed trailer hitch devices, although the longitudinal pivot rivet 180 can be made of other suitable material. The longitudinal pivot rivet 180 prevents the trailer yoke 160 or a connection bar (not shown) from possibly binding and causing damage to the lock and roll designed trailer hitch, the vehicle or the trailer. More details regarding the longitudinal pivot rivet 180 is provided in FIG. 3 and its description. In previous lock and roll designed trailer hitch devices, when a driver of a vehicle using a lock and roll designed trailer hitch device allows the trailer and vehicle to jack knife, the tongue (not shown) of the trailer can drop. Because there is no force available to raise the trailer back up, the twisting force exerted on the lock and roll designed trailer hitch device when the vehicle moves forward can do considerable damage to the lock and roll designed trailer hitch, the vehicle or the trailer. Moving the longitudinal pivot point to the vehicle side 102 of the trailer hitch device 100 eliminates this problem. The horizontal coupling shaft 150 is also longer than on other lock and roll designed hitch devices to prevent the trailer hitch device 100 from being used with other older trailer hitch devices.

Figure 2:
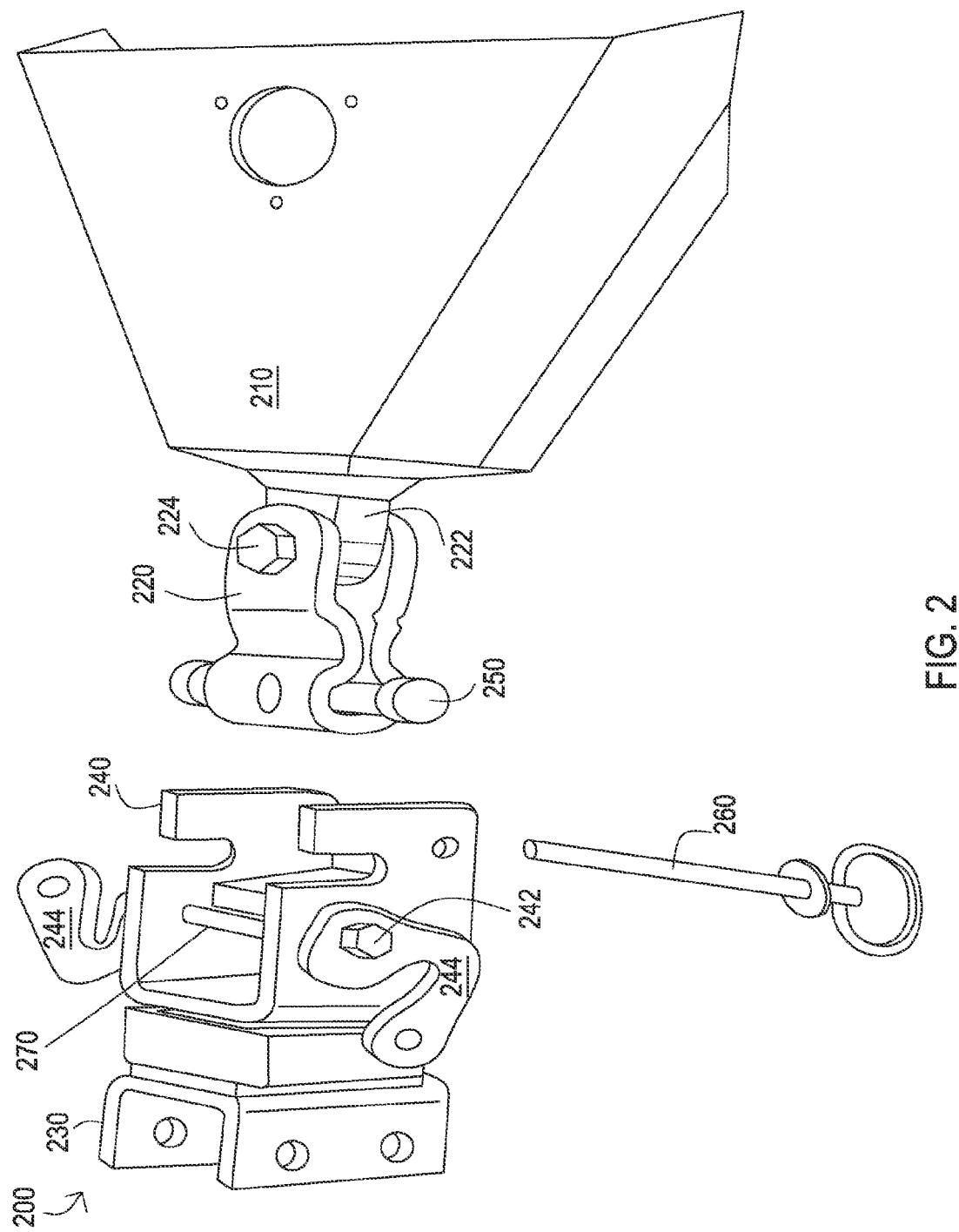
FIG. 2 illustrates a partially exploded side perspective view of a trailer hitch device, in accordance with one embodiment of the present invention.

FIG. 2 illustrates an exploded side perspective view of a trailer hitch device 200, in accordance with one embodiment of the present invention. The trailer hitch device 200 illustrated in FIG. 2 has all of the same features as the trailer hitch device illustrated in FIG. 1, except that a trailer bracket 210 is disposed on the proximal section 222 of the trailer yoke 220 and an angle iron brace 230 is provided adjacent to the latch assembly 240 for added strength. These other features include the latch pivot bolt 242, the two latch pivot plates 244, the vertical pivotal bolt 224 of the trailer yoke 220, the horizontal coupling shaft 250, the hitch pin 260 and the longitudinal pivot rivet 270. More details regarding the longitudinal pivot rivet 270 are provided in FIG. 3 and its description.

FIG. 3 illustrates a side perspective view of a longitudinal pivot rivet 310 of a trailer hitch device 300, in accordance with one embodiment of the present invention. The longitudinal pivot rivet 310 is a longitudinal connection and rotational pivot point adjustably disposed on the vehicle side 302 of the trailer hitch device 300. The longitudinal pivot rivet 310 is disposed within the latch assembly 340 and is rotationally attached to the yoke section 360 with a washer 350 of the trailer hitch device 300. The longitudinal rotation bearing surface 320 is longer than other lock and roll designed trailer hitch devices and has a grease fitting 330 for ease of use.

While the present invention has been related in terms of the foregoing embodiments, those skilled in the art will recognize that the invention is not limited to the embodiments described.

The present invention can be practiced with modification and alteration within the spirit and scope of the appended claims. Thus, the description is to be regarded as illustrative instead of restrictive on the present invention.

The invention claimed is:

1. A trailer hitch device with a vehicle side and a trailer side, comprising:
   a yoke assembly that includes a yoke section with two sides and a latch section with two sides;
   a latch assembly integral with said latch section with a latch pivot bolt, two latch plates pivotally connected on said sides of latch section by said latch pivot bolt;
   a horizontal coupling shaft having two external ends, wherein said external ends are dimensioned to fit into a vertical opening on said sides of latch section secured by said latch plates;
   a trailer yoke with a distal end and a proximal end wherein said horizontal coupling shaft passes through said distal end and said horizontal coupling shaft can be securely and pivotally connected to said latch assembly by placing said horizontal coupling shaft in said vertical openings of said latch section, rotating said latch plates down over said horizontal coupling shaft and securing said latch plates in position; and
   a longitudinal connection and rotational pivot point adjustably disposed on said vehicle side of trailer hitch device.

2. The device according to claim 1, wherein said yoke section has a washer.

3. The device according to claim 1, wherein said horizontal coupling shaft has a raised surface on said external ends.

4. The device according to claim 1, wherein said horizontal coupling shaft secures said latch plates in position with a hitch pin.

5. The device according to claim 1, wherein said trailer yoke is a two piece trailer yoke that held together by a vertical pivot bolt.

6. The device according to claim 1, wherein said longitudinal connection and rotational pivot point adjustably connects said yoke section to said latch section.

7. The device according to claim 6, wherein said longitudinal connection and rotational pivot point utilizes a grease fitting.

8. The device according to claim 7, wherein said longitudinal connection and rotational pivot point is a longitudinal pivot rivet.

9. The device according to claim 8, wherein said longitudinal pivot rivet is made of an alloy steel rivet.

10. The device according to claim 1, wherein said trailer hitch device is a lock and roll designed trailer hitch device.

11. A trailer hitch device with a vehicle side and a trailer side, comprising:
    a yoke assembly that includes a yoke section with a washer, with two sides and a latch section with two sides;
    a latch assembly integral with said latch section with a latch pivot bolt, two latch plates pivotally connected on said sides of latch section by said latch pivot bolt;
    a horizontal coupling shaft having two external ends, wherein said external ends are dimensioned to fit into a vertical opening on said sides of latch section secured by said latch plates;
    a trailer yoke with a distal end and a proximal end wherein said horizontal coupling shaft passes through said distal end and said horizontal coupling shaft can be securely and pivotally connected to said latch assembly by placing said horizontal coupling shaft in said vertical openings of said latch section, rotating said latch plates down over said horizontal coupling shaft and securing said latch plates in position; and
    a longitudinal connection and rotational pivot point adjustably connecting said yoke section to said latch section.

12. The device according to claim 11, wherein said horizontal coupling shaft secures said latch plates in position with a hitch pin.

13. The device according to claim 11, wherein said trailer yoke is a two piece trailer yoke that held together by a vertical pivot bolt.

14. The device according to claim 11, wherein said longitudinal connection and rotational pivot point utilizes a grease fitting.

15. The device according to claim 14, wherein said longitudinal connection and rotational pivot point is a longitudinal pivot rivet.

16. The device according to claim 15, wherein said longitudinal pivot rivet is made of an alloy steel rivet.

17. The device according to claim 11, wherein said trailer hitch device is a lock and roll designed trailer hitch device.

18. A lock and roll designed trailer hitch device with a vehicle side and a trailer side, comprising:
    a yoke assembly that includes a yoke section with a washer with two sides and a latch section with two sides;
    a latch assembly integral with said latch section with a latch pivot bolt, two latch plates pivotally connected on said sides of latch section by said latch pivot bolt;
    a horizontal coupling shaft having two external ends, wherein said external ends are dimensioned to fit into a vertical opening on said sides of latch section secured by said latch plates;
    a trailer yoke with a distal end and a proximal end wherein said horizontal coupling shaft passes through said distal end and said horizontal coupling shaft can be securely and pivotally connected to said latch assembly by placing said horizontal coupling shaft in said vertical openings of said latch section, rotating said latch plates down over said horizontal coupling shaft and securing said latch plates in position with a hitch pin; and
    a longitudinal pivot rivet connecting said yoke section to said latch section that utilizes a grease fitting.

19. The device according to claim 18, wherein said trailer yoke is held together by a vertical pivot bolt.

20. The device according to claim 18, wherein said pivot rivet is made of an alloy steel rivet.

* * * * *